United States Patent
Do

(10) Patent No.: US 6,833,968 B2
(45) Date of Patent: Dec. 21, 2004

(54) IMAGE PICKUP LENS

(75) Inventor: Satoshi Do, Tokyo (JP)

(73) Assignee: Milestone Co., Ltd., Tokyo (JP)

( * ) Notice: Subject to any disclaimer, the term of this patent is extended or adjusted under 35 U.S.C. 154(b) by 13 days.

(21) Appl. No.: 10/607,137

(22) Filed: Jun. 27, 2003

(65) Prior Publication Data

US 2004/0027478 A1 Feb. 12, 2004

(30) Foreign Application Priority Data

Jul. 31, 2002 (JP) ........................................ 2002-222675

(51) Int. Cl.[7] ............................ G02B 3/02; G02B 13/18; G02B 9/34
(52) U.S. Cl. ........................................ 359/795; 359/717
(58) Field of Search ................................ 359/793, 795, 359/713–717, 708, 721, 646, 692

(56) References Cited

U.S. PATENT DOCUMENTS

| 2,063,178 | A | 8/1936 | Willy |
| 5,329,403 | A | 7/1994 | Fukasawa |
| 5,801,890 | A | 9/1998 | Yamada |
| 6,011,660 | A | 1/2000 | Nagahara |
| 2003/0081330 | A1 * | 5/2003 | Do et al. .................... 359/717 |

FOREIGN PATENT DOCUMENTS

| JP | 03-075712 | 3/1991 |
| JP | 06-043361 | 2/1994 |
| JP | 07 020375 | 1/1995 |
| JP | 09-197273 | 7/1997 |
| JP | 10206730 | 7/1998 |
| JP | 10-206726 | 8/1998 |
| JP | 10-206730 | 8/1998 |
| JP | 11 133297 | 5/1999 |
| JP | 2000-292696 | 10/2000 |

OTHER PUBLICATIONS

"Renzu no Sckkei Gihou", Fumio Kondo, Kougaku Kougyou Gijutsu Kyoukai, 2nd edition Feb. 1, 1983, p. 185–191.

* cited by examiner

Primary Examiner—Georgia Epps
Assistant Examiner—Alicia M. Harrington
(74) Attorney, Agent, or Firm—Venable; James R. Burdett

(57) ABSTRACT

An image pickup lens is provided in which various aberrations are satisfactorily corrected, and the optical length is not more than 6 mm, and moreover a sufficient back focus is secured. This image pickup lens is configured by arranging, in order from the object side, an aperture diaphragm $S_1$; a first lens $L_1$ having a meniscus shape with concave surface facing the object side, and having positive refractive power; a second diaphragm $S_2$; and a second lens $L_2$ having a meniscus shape with concave surface facing the image side, and having negative refractive power. The aperture diaphragm $S_1$ forms an incidence plane. The second diaphragm $S_2$ provided between the first lens $L_1$ and the second lens $L_2$ is inserted in order to cut out so-called flare, which is light which strikes the peripheral edge of a lens or similar and is irregularly reflected.

9 Claims, 13 Drawing Sheets

IMAGE PICKUP LENS

BACKGROUND OF THE INVENTION

1. Field of the Invention

This invention relates to an image pickup lens suitable for mounting in a camera which uses a CCD or CMOS device as a pickup element.

2. Description of Related Art

One characteristic of this lens for mounting in a compact camera using a CCD or CMOS device as a pickup element is a short optical length. One lens of this type is for example the pickup lens disclosed in Japanese Patent Laid-open No. 10-206730.

However, in the pickup lens disclosed in this reference the distance from the aperture diaphragm plane to the second surface (the image-side surface) of the second lens is 5.3 mm, and the optical length is too long for use as a lens mounted in a compact camera using a CCD or CMOS device as a pickup element. In the pickup lens system disclosed in Japanese Patent Laid-open No. 10-206730, an aperture diaphragm is inserted between the first lens and the second lens. That is, the pickup lens system, disclosed in this reference employs a construction in which only one diaphragm is provided.

It is known that the position of an aperture diaphragm has important significance for lens design (see for example Fumio Kondo, Renzu no Sekkei Gihou, Kougaku Kougyou Gijutsu Kyoukai, 2nd edition Feb. 1, 1983). In other words, it is known that: (a) the entrance pupil position conjugate with the aperture diaphragm position is related to coma aberration, astigmatic aberration, distortion aberration, and similar, and is the basis for determining the third-order aberration coefficient; (b) when an aperture diaphragm is set at the position a distance t from the object-side surface (first surface) of the first lens counting from the object side (the first lens), measured along the optical axis moving toward the image side, if the value of B as defined by the equation (i) below is 0, then the basis is given for the Fraunhofer condition, according to which a sufficiently small aberration is realized;

$$B = C - St \quad (i)$$

where C and S are constants related to the third-order aberration coefficient; and, (c) the basis is given for the Zinken-Sommer condition, according to which the closer the value of Z as defined in equation (ii) below is to 0, the better the aberration correction is guaranteed to be;

$$Z = St^2 - 2Ct + A \quad (ii)$$

where C, S, and A are constants related to the third-order aberration coefficient.

In this way, when conducting a quantitative examination of aberration, the position of an aperture diaphragm plays an essential role, and is an important basic parameter of the lens system.

However, a short optical length is required of an image pickup lens for mounting in a compact camera as described above. In addition, an image pickup lens mounted in a compact camera as described above must be such that distortion of the formed image is not perceived visually, and such that various aberrations are corrected to small values as required by the integration density of the pickup element.

In the following explanation, "various aberrations are corrected to amounts sufficiently small that distortion of the image is not recognized by visual perception, and sufficiently small as to satisfy the requirements of the integration density of the pickup element" is, for simplicity, represented by the phrase "various aberrations are satisfactorily corrected" or similar. An image for which various aberrations are satisfactorily corrected may be called a "satisfactory image".

An object of this invention is to provide an image pickup lens in which various aberrations are satisfactorily corrected, the optical length is short, and moreover sufficient back focus is maintained.

SUMMARY OF THE INVENTION

An image pickup lens of this invention which achieves the above object is configured by arranging, in order from the object side, an aperture diaphragm $S_1$; a first lens $L_1$; a second diaphragm $S_2$; and a second lens $L_2$. The first lens $L_1$ has a meniscus shape with the concave surface facing the object side, and having positive refractive power. The second lens $L_2$ has a meniscus shape with the concave surface facing the image side, and having negative refractive power.

Further, in the image pickup lens, at least one surface of the first lens $L_1$ is aspherical, at least one surface of the second lens $L_2$ is aspherical, and overall at least two lens surfaces are aspherical; and the following conditions are satisfied.

$$0.09 < |f_1/f_2| < 0.37 \quad (1)$$

$$1.33 < |r_1/f| < 47.77 \quad (2)$$

$$3.08 < |r_1/r_2| < 113.12 \quad (3)$$

$$0.63 < D/f < 0.87 \quad (4)$$

Here f is the focal length of the entire system (the combined focal length of the lens system comprising the first and second lenses), $f_1$ is the focal length of the first lens, $f_2$ is the focal length of the second lens, D is the distance from the aperture diaphragm plane to the second surface (image-side surface) of the second lens (lens center length), $r_1$ is the radius of curvature of the object-side surface of the first lens $L_1$ in the vicinity of the optical axis (axial radius of curvature), and $r_2$ is the radius of curvature of the image-side surface of the first lens $L_1$ in the vicinity of the optical axis (axial radius of curvature).

The aperture diaphragm $S_1$ of this invention is positioned between the object and the first lens $L_1$. In other words, the aperture diaphragm $S_1$ is set on the outside of the first lens $L_1$, that is, in front of the first surface (the object-side surface) of the first lens. This aperture diaphragm $S_1$ forms an incidence plane. A second diaphragm $S_2$ provided between the first lens $L_1$ and the second lens $L_2$ is inserted in order to cut out so-called flare, which is light which strikes the peripheral edge of a lens or similar and is irregularly reflected.

Next, the significance of the above condition equations (1) through (4) is explained.

The above condition equation (1) determines the power distribution of the first lens $L_1$ and second lens $L_2$; if $|f_1/f_2|$ falls below the lower limit, the power of the first lens $L_1$ is stronger and the power of the second lens is weaker, so that correction of the spherical aberration, coma aberration, and distortion aberration produced by the first lens becomes difficult. And if $|f_1/f_2|$ exceeds the upper limit, the power of the first lens $L_1$ becomes weaker, and consequently the power of the second lens must be increased in order to shorten the combined focal length f and back focus $b_f$ (distance from the point of intersection of the image-side surface of the second surface of the second lens with the optical axis, to the point of intersection of the light-receiving surface with the optical axis) of the lens system. Hence correction of the distortion aberration and coma aberration produced by the second lens $L_2$ becomes difficult. As a result, if $|f_1/f_2|$ falls below the lower limit or rises above the upper limit, a satisfactory image cannot be obtained. Consequently using an image pickup lens of this invention which satisfies the condition equation (1), a satisfactory image can be obtained.

The above condition equation (2) sets the range for the value of $|r_1/f|$ when the radius of curvature $r_1$ on the object side of the first lens $L_1$ is normalized by the combined focal length f for the pickup lens system. If $|r_1/f|$ falls below the lower limit, coma aberration increases, and if an attempt is made to correct this, distortion aberration results. Hence the need arises for means to cut rays which pass through the peripheral portions of lenses, and as a result the image is darker.

On the other hand, if $|r_1/f|$ exceeds the upper limit, astigmatic aberration and coma aberration are increased, and moreover the lens thickness is increased, so that a satisfactory image cannot be obtained over a broad angle range. That is, if the radius of curvature $r_1$ on the object side of the first lens $L_1$ is set so as to satisfy condition equation (2), it becomes easy to correct the coma aberration, astigmatic aberration and distortion aberration of the pickup lens, the pickup lens can be made more compact while, maintaining broad angles, and in addition image brightness can be preserved.

The above condition equation (3) stipulates the ratio of the radii of curvature $r_1$ and $r_2$ of the first lens $L_1$; if $|r_1/r_2|$ falls below the lower limit, the optical length increases, or the lens diameter increases, or distortion aberration is increased. On the other hand, if $|r_1/r_2|$ rises above the upper limit, coma aberration increases. In other words, if calculations are performed so as to satisfy condition equation (3), correction of the coma aberration and distortion aberration of the pickup lens becomes easy, and moreover the pick lens can be made more compact.

The above condition equation (4) stipulates the range for the value obtained by normalizing the distance D from the point of intersection of the aperture diaphragm $S_1$ with the optical axis to the point of intersection of the second surface (image-side surface) of the second lens with the optical axis by the combined focal length f for the lens system. When this lens system is actually used, cover glass or similar is inserted behind (on the image side of) the second lens $L_2$. The value of D/f provides an indicator of the magnitude of the optical length (the distance from the incidence aperture position to the imaging plane) of the entire image pickup lens of this invention, with the cover glass or other optical component added. By keeping this value within the range of the condition equation (4), the optical length as calculated assuming the use of cover glass or similar can be kept to a length within the range allowable for practical application.

As is clear from the first embodiment through the fourth embodiment described below, the four conditions stipulated by the condition equations (1) through (4) make possible the realization of an image pickup lens in which various aberrations are satisfactorily corrected, which has an optical length of 6 mm or less (D value of 2.98 mm or less), and which affords excellent productivity.

Looking again at the pickup lens system disclosed in Japanese Patent Laid-open No. 10-206730, as has already been explained, an aperture diaphragm is set between the first lens and the second lens. On the other hand, in this invention the aperture diaphragm position is in front of the first lens. As a result, the manner in which various aberrations appear is clearly different for this invention and for the pickup lens system disclosed in Japanese Patent Laid-open No. 10-206730, and the lens system disclosed in the above reference can be understood to be structurally different from the lens system of this invention.

Further, it is preferable that in an image pickup lens of this invention, all component lenses be formed from plastic material (a polymer material which can be molded and shaped by plastic deformation under the application of heat or pressure, or both, and which is transparent to visible light).

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Figure 1:
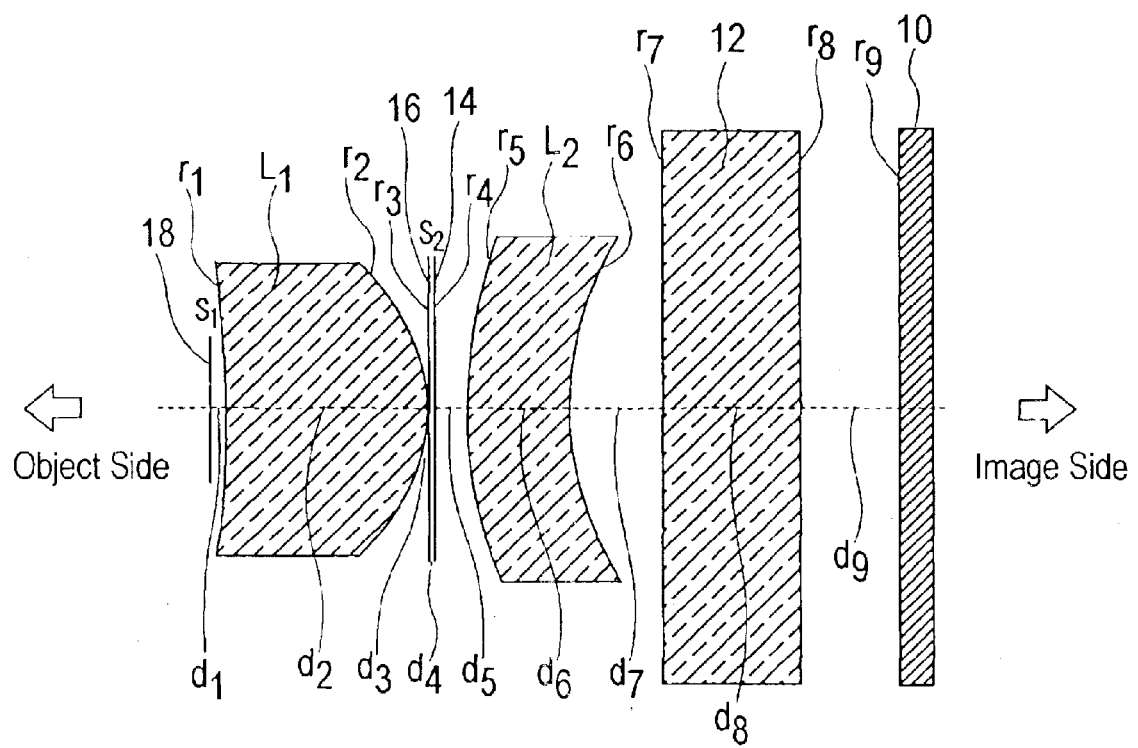
FIG. 1 is a summary cross-sectional view to explain the configuration of an image pickup lens of this invention.

Below, aspects of this invention are explained, referring to the drawings. These drawings merely show in summary the shapes, sizes, and positional relations of components to an extent enabling an understanding of this invention, and the numerical and other conditions explained below are merely suitable examples; the present invention is not limited only to the aspects of the invention.

Embodiments

FIG. 1 is a drawing of the configuration of an image pickup lens of this invention. The first and second lenses, counting in order from the object side toward the image side, are indicated respectively by $L_1$ and $L_2$. The pickup surface (light-receiving surface of the solid-state pickup element) is represented by 10; the cover glass separating the pickup surface and the lens system is represented by 12; the two planes comprised by the second diaphragm $S_2$ are represented by 14 and 16, in order respectively from the image side to the object side; and the plane of the diaphragm comprised by the aperture diaphragm $S_1$ is represented by 18.

The parameters $r_i$ (i=1, 2, 3, ..., 9) and $d_i$ (i=1, 2, 3, ..., 9) and other parameters shown in this drawing are assigned specific numerical values in Table 1 through Table 4 below. The subscripts i=1, 2, ..., 9 are assigned to correspond to lens surface numbers, or to lens thicknesses or intervals between lenses, in order from the object side toward the image side. That is, $r_i$ is the radius of curvature of the ith surface (for an aspherical surface, the radius of curvature at the axis); $d_i$ is the distance from the ith surface to the i+1th surface; $N_i$ is the refractivity of the lens media from the ith surface to the i+1th surface; and, $v_i$ is the dispersion of the lens media from the ith surface to the i+1th surface.

The optical length is the value obtained by adding $d_1$ to $d_9$.

The back focus $b_f$ is $d_7+d_8+d_9$.

Also, $D=d_1+d_2+d_3+d_4+d_5+d_6$.

Aspherical data is shown, together witch surface numbers, in the right-hand columns of Table 1 through Table 4. Because the surfaces in question are flat planes, the values of the radii of curvature $r_3$ and $r_4$ of the second diaphragm $S_2$ and $r_7$ and $r_8$ of the cover glass are indicated by $\infty$.

An aspherical surface used in this invention is represented by the following equation.

$$Z=ch^2/[1+[1-(1+k)c^2h^2]+1/2]+A_0h^4+B_0h^6+C_0h^8+D_0h^{10}$$

Here Z is the depth from the plane which is tangential at the lens vertex, c is the curvature of the surface in the vicinity of the optical axis, h is the height from the optical axis, k is the conic constant, $A_0$ is the fourth-order aspheric coefficient, $B_0$ is the sixth-order aspheric coefficient, $C_0$ is the eighth-order aspheric coefficient, and $D_0$ is the tenth-order aspheric coefficient.

In each of Table 1 through Table 4 in this Specification, in representations of numerical values indicating aspheric coefficients, "e–1" means "$10^{-1}$". Moreover, a value shown as a focal length f is the combined focal length of the lens system comprising the first and second lenses.

The first through fourth embodiments are explained below, referring to FIG. 2 through FIG. 17.

FIG. 2, FIG. 6, FIG. 10, and FIG. 14 show summary cross-sectional views of lens configurations and spot diagrams, and indicate the degree of spreading of a point image on the image plane with respect to the distance of incidence. In these drawings, the spot images are drawn surrounded by a rectangle on the right side of the pickup plane 10 (light-receiving surface of the solid-state pickup element) which is long in the vertical direction, showing the extent of spreading of the point image projected on the pickup plane 10 to correspond to the size of a circle. Distortion aberration curves are shown in FIG. 3, FIG. 7, FIG. 11 and FIG. 15, astigmatic aberration curves in FIG. 4, FIG. 8, FIG. 12 and FIG. 16, and chromatic/spherical aberration in FIG. 5, FIG. 9, FIG. 13 and FIG. 17.

A distortion aberration curve shows the aberration amount (the amount by which the tangent condition is not satisfied, expressed as a percentage along the horizontal axis) versus the distance from the optical axis (expressed as a percentage along the vertical axis, with the maximum distance from the optical axis within the image plane equal to 100). An astigmatic aberration curve shows the amount of aberration along the horizontal axis (in mm units) for a distance from the optical axis, similarly to a distortion aberration curve. Astigmatism was represented as aberration amounts (in mm units) in the meridional plane and in the sagittal plane. A chromatic/spherical aberration curve shows the amount of aberration along the horizontal axis (in mm units) for a distance of incidence h (F number). In a chromatic/spherical aberration curve, aberration amounts are shown for the C line (light of wavelength 656.3 nm), the d line (light of wavelength 587.6 nm), the e line (light of wavelength 546.1 nm), the F line (light of wavelength 486.1 nm), and the g line (light of wavelength 435.8 nm). The refractivity is the refractivity for the d line (light of wavelength 5,87.6 nm).

Below, the radii of curvature of component lenses (mm units), intervals between lens surfaces (mm units), refractivity of lens materials, Abbe number of lens materials, focal length, numerical apertures, and aspheric coefficients are listed for the first embodiment (Table 1), second embodiment. (Table 2), third embodiment (Table 3), and fourth embodiment (Table 4).

TABLE 1

First Embodiment

| Radius of Curvature ($r_i$) | Distance ($d_i$) | Refractivity ($N_i$) | Abbe Number ($v_i$) | Aspheric Coefficient | | | | |
|---|---|---|---|---|---|---|---|---|
| | | | | k | $A_0$ | $B_0$ | $C_0$ | $D_0$ |
| $r_1 = -15.3122$ | | | | 0.3088e+3 | –0.2737e–1 | 0.1308e0 | –0.6038e0 | 0.5411e0 |
| | $d_1 = 0.1300$ | | | | | | | |
| $r_2 = -1.5519$ | | | | 1.740e0 | 0.2747e–1 | –0.4643e–1 | 0.6315e–1 | –0.2187e–1 |
| | $d_2 = 1.6000$ | $N_2 = 1.53$ | $v_2 = 56.0$ | | | | | |
| $r_3 = \infty$ | | | | | | | | |
| | $d_3 = 0$ | | | | | | | |
| $r_4 = \infty$ | | | | | | | | |
| | $d_4 = 0.0500$ | | | | | | | |
| $r_5 = 3.5240$ | | | | 0.1183e+1 | –0.2305e–1 | 0.9359e–2 | –0.1240e–2 | –0.9924e–4 |
| | $d_5 = 0.2500$ | | | | | | | |
| $r_6 = 2.3577$ | | | | 0.2350e0 | 0.1247e–1 | –0.3995e–1 | 0.2641e–1 | –0.5894e–2 |
| | $d_6 = 0.800$ | $N_6 = 1.53$ | $v_6 = 56.0$ | | | | | |

TABLE 1-continued

First Embodiment

| Radius of Curvature ($r_i$) | Distance ($d_i$) | Refractivity ($N_i$) | Abbe Number ($v_i$) | k | $A_0$ | $B_0$ | $C_0$ | $D_0$ |
|---|---|---|---|---|---|---|---|---|
| $r_7 = \infty$ | | | | | | | | |
| | $d_7 = 0.800$ | | | | | | | |
| $r_8 = \infty$ | | | | | | | | |
| | $d_8 = 1.0500$ | $N_8 = 1.52$ | Cover Glass | | | | | |
| $r_9 = \infty$ | | | | | | | | |
| | $d_9 = 0.8145$ | | | | | | | |

Focal Length f = 3.296 mm
Numerical Aperture Fno = 2.80

TABLE 2

Second Embodiment

| Radius of Curvature ($r_i$) | Distance ($d_i$) | Refractivity ($N_i$) | Abbe Number ($v_i$) | k | $A_0$ | $B_0$ | $C_0$ | $D_0$ |
|---|---|---|---|---|---|---|---|---|
| $r_1 = -4.9982$ | | | | 0.2088e+2 | −0.2700e−1 | −0.8479e−2 | −0.1668e0 | 0.1490e0 |
| | $d_1 = 0.1000$ | | | | | | | |
| $r_2 = -1.6179$ | | | | 0.1066e0 | −0.2228e−1 | 0.7325e−2 | −0.3840e−2 | −0.1272e−2 |
| | $d_2 = 1.3000$ | $N_2 = 1.53$ | $v_2 = 56.0$ | | | | | |
| $r_3 = \infty$ | | | | | | | | |
| | $d_3 = 0$ | | | | | | | |
| $r_4 = \infty$ | | | | | | | | |
| | $d_4 = 0.0500$ | | | | | | | |
| $r_5 = 2.0396$ | | | | 0.6279e−1 | −0.3664e−1 | 0.2669e−2 | −0.3176e−2 | 0.1428e−2 |
| | $d_5 = 0.1500$ | | | | | | | |
| $r_6 = 1.6019$ | | | | −0.2613e0 | 0.2194e−1 | −0.7339e−1 | 0.4147e−1 | −0.8256e−2 |
| | $d_6 = 0.8000$ | $N_6 = 1.53$ | $v_6 = 56.0$ | | | | | |
| $r_7 = \infty$ | | | | | | | | |
| | $d_7 = 0.9630$ | | | | | | | |
| $r_8 = \infty$ | | | | | | | | |
| | $d_8 = 1.0500$ | $N_8 = 1.52$ | Cover Glass | | | | | |
| $r_9 = \infty$ | | | | | | | | |
| | $d_9 = 1.2159$ | | | | | | | |

Focal Length f = 3.74 mm
Numerical Aperture = 2.80

TABLE 3

Third Embodiment

| Radius of Curvature ($r_i$) | Distance ($d_i$) | Refractivity ($N_i$) | Abbe Number ($v_i$) | k | $A_0$ | $B_0$ | $C_0$ | $D_0$ |
|---|---|---|---|---|---|---|---|---|
| $r_1 = -10.1892$ | | | | 0.3485e+2 | −0.4651e−1 | 0.2140e−1 | −0.9504e−1 | 0.5164e−1 |
| | $d_1 = 0.0850$ | | | | | | | |
| $r_2 = -1.7455$ | | | | −0.5254e−1 | −0.1206e−1 | 0.8422e−2 | −0.3085e−2 | −0.9854e−3 |
| | $d_2 = 1.6000$ | $N_2 = 1.53$ | $v_2 = 56.0$ | | | | | |
| $r_3 = \infty$ | | | | | | | | |
| | $d_3 = 0$ | | | | | | | |
| $r_4 = \infty$ | | | | | | | | |
| | $d_4 = 0.0500$ | | | | | | | |
| $r_5 = 2.2687$ | | | | 0.1914e0 | −0.3215e−1 | 0.7814e−2 | −0.3069e−2 | 0.1297e−3 |
| | $d_5 = 0.2500$ | | | | | | | |
| $r_6 = 1.5926$ | | | | −0.4005e0 | 0.7101e−2 | −0.4901e−1 | 0.3515e−1 | −0.9398e−2 |
| | $d_6 = 0.7800$ | $N_6 = 1.53$ | $v_6 = 56.0$ | | | | | |
| $r_7 = \infty$ | | | | | | | | |
| | $d_7 = 1.1306$ | | | | | | | |
| $r_8 = \infty$ | | | | | | | | |
| | $d_8 = 1.0500$ | $N_8 = 1.52$ | Cover Glass | | | | | |
| $r_9 = \infty$ | | | | | | | | |
| | $d_9 = 1.0000$ | | | | | | | |

Focal Length f = 3.912 mm
Numerical Aperture Fno = 2.80

TABLE 4

Fourth Embodiment

| Radius of Curvature ($r_i$) | Distance ($d_i$) | Refractivity ($N_i$) | Abbe Number ($v_i$) | Aspheric Coefficient | | | | |
|---|---|---|---|---|---|---|---|---|
| | | | | k | $A_0$ | $B_0$ | $C_0$ | $D_0$ |
| $r_1 = -167.0550$ | | | | 0.6585e+2 | −0.6152e−1 | −0.1515e−1 | −0.1136e0 | 0.4456e−1 |
| | $d_1 = 0.0750$ | | | | | | | |
| $r_2 = -1.4769$ | | | | −0.9126e−1 | −0.1475e−1 | 0.6474e−2 | −0.3766e−2 | −0.2370e−2 |
| | $d_2 = 1.4000$ | $N_2 = 1.53$ | $v_2 = 56.0$ | | | | | |
| $r_3 = \infty$ | | | | | | | | |
| | $d_3 = 0$ | | | | | | | |
| $r_4 = \infty$ | | | | | | | | |
| | $d_4 = 0.0500$ | | | | | | | |
| $r_5 = 3.3843$ | | | | 0.7694e−1 | −0.2977e−1 | −0.6861e−2 | −0.9187e−3 | 0.3984e−2 |
| | $d_5 = 0$ | | | | | | | |
| $r_6 = 1.7058$ | | | | −0.4174e0 | 0.1363e−1 | −0.6230e−1 | 0.3515e−1 | −0.5201e−2 |
| | $d_6 = 0.7800$ | $N_6 = 1.53$ | $v_6 = 56.0$ | | | | | |
| $r_7 = \infty$ | | | | | | | | |
| | $d_7 = 0.8000$ | | | | | | | |
| $r_8 = \infty$ | | | | | | | | |
| | $d_8 = 0.7000$ | $N_8 = 1.493$ | Cover Glass | | | | | |
| $r_9 = \infty$ | | | | | | | | |
| | $d_9 = 1.2658$ | | | | | | | |

Focal Length f = 3.498 mm
Numerical Aperture Fno = 2.80

Below, the characteristics of each of the embodiments are discussed.

In all of the first through the fourth embodiments, ZEONEX E48R (ZEONEX is a registered trademark, and E48R is a product number, of Nippon Zeon Co., Ltd.), which is a cycloolefin plastic, was employed in the first lens ($L_1$), which has a meniscus shape with the concave surface facing the object side and with positive refractive power, and in the second lens ($L_2$), which has a meniscus shape with the concave surface facing the image side and with negative refractive power.

Both surfaces of the first lens ($L_1$) and both surfaces of the second lens ($L_2$) are aspherical. That is, the number of spherical surfaces is four in each of the embodiments.

The Abbe number of the ZEONEX E48R which is the material of the first lens ($L_1$) and second lens ($L_2$) is 56; from simulation results it was found that if the Abbe number of the material of these lenses is in the range from 45 to 65, no practical difference occurs in the aberration or other lens performance. It was found that if the Abbe number is within the above range of values, a pickup lens can be realized which satisfies objects of this invention, which are satisfactory correction of various aberrations of the pickup lens compared with the various aberrations of a pickup lens of the prior art, and an optical length of 6 mm or less.

In the first embodiment, second embodiment, and third embodiment, cover glass of thickness 1.05 mm is inserted between the lens system and the pickup surface; in the fourth embodiment, 0.70 mm cover glass is inserted. The material of the cover glass is, in the three examples of the first through the third embodiments, glass material of refractivity 1.52, and in the fourth embodiment, acrylic resin material of refractivity 1.493. The various aberrations explained below are calculated assuming the existence of these cover glasses. That is, the cover glasses comprise the $r_7$ and $r_8$ surfaces, and the parameter $d_8$ representing the thickness is, for the three examples of the first through third embodiments, $d_8 = 1.05$ mm, and for the fourth embodiment, $d_8 = 0.70$ mm.

First Embodiment (A) The focal length for the entire system is f=3.296 mm.
(B) The focal length of the first lens is $f_1 = 3.13$ mm.
(C) The focal length of the second lens is $f_2 = -17.63$ mm.
(D) The radius of curvature of the object-side surface of the first lens is $r_1 = -15.3122$ mm.
(E) The radius of curvature of the image-side surface of the first lens is $r_2 = -1.5519$ mm.
(F) The distance from the aperture diaphragm position to the second surface of the second lens is D=2.83 mm.

Hence:

$$|f_1/f_2| = |3.13/-17.63| = 0.1775 \approx 0.18 \quad (1)$$

$$|r_1/f| = |-15.3122/3.296| = 4.646 \approx 4.65 \quad (2)$$

$$|r_1/r_2| = |-15.3122/-1.5519| = 9.867 \approx 9.87 \quad (3)$$

$$D/f = 2.83/3.296 = 0.8586 \approx 0.86 \quad (4)$$

Therefore the lens system of the first embodiment satisfies all of the following condition equations (1) through (4).

$$0.09 < |f_1/f_2| < 0.37 \quad (1)$$

$$1.33 < |r_1/f| < 47.77 \quad (2)$$

$$3.08 < |r_1/r_2| < 113.12 \quad (3)$$

$$0.63 < D/f < 0.87 \quad (4)$$

Below, "condition equations" refers to the above four condition equations (1) through (4).

The aperture diaphragm $S_1$ is as indicated in Table 1, and is provided at a position 0.13 mm ($d_1 = 0.13$ mm) in front of the first surface of the first lens (the object-side surface). The numerical aperture (F number) is 2.8, and the combined focal length f is 3.296 mm.

Figure 2:
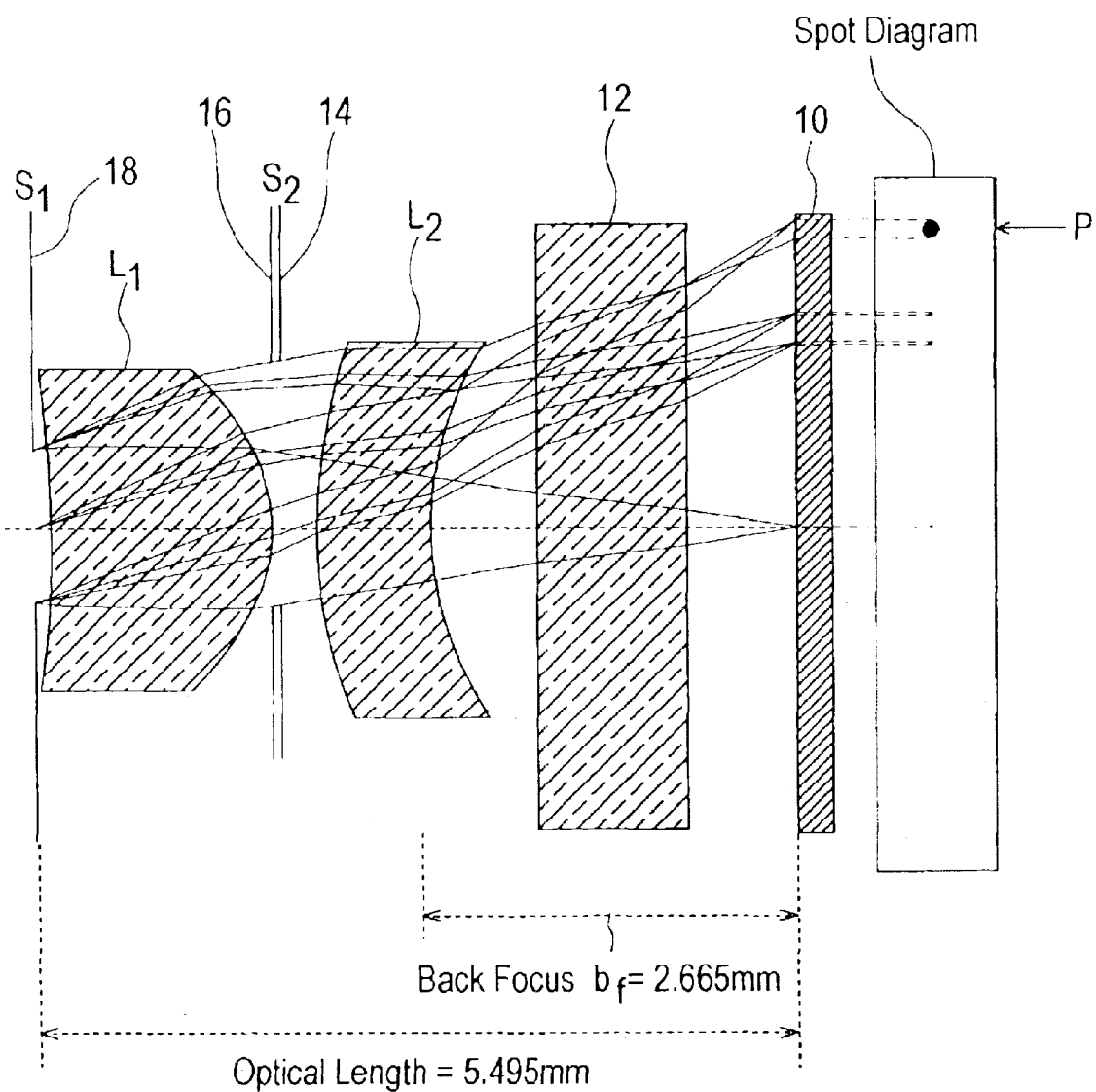
FIG. 2 is a summary cross-sectional view to explain a first embodiment of an image pickup lens of this invention.

FIG. 2 shows the results of ray tracing, and a spot diagram showing the spreading of a point image on the pickup surface. It is seen that there is some spreading of the point image P only very close to the peripheral portion, and that a satisfactory point image is obtained over nearly the entirety of the pickup surface.

The optical length is 5.495 mm, which is within 6 mm, and a sufficient back focus of 2.665 mm is also secured.

Figure 3:
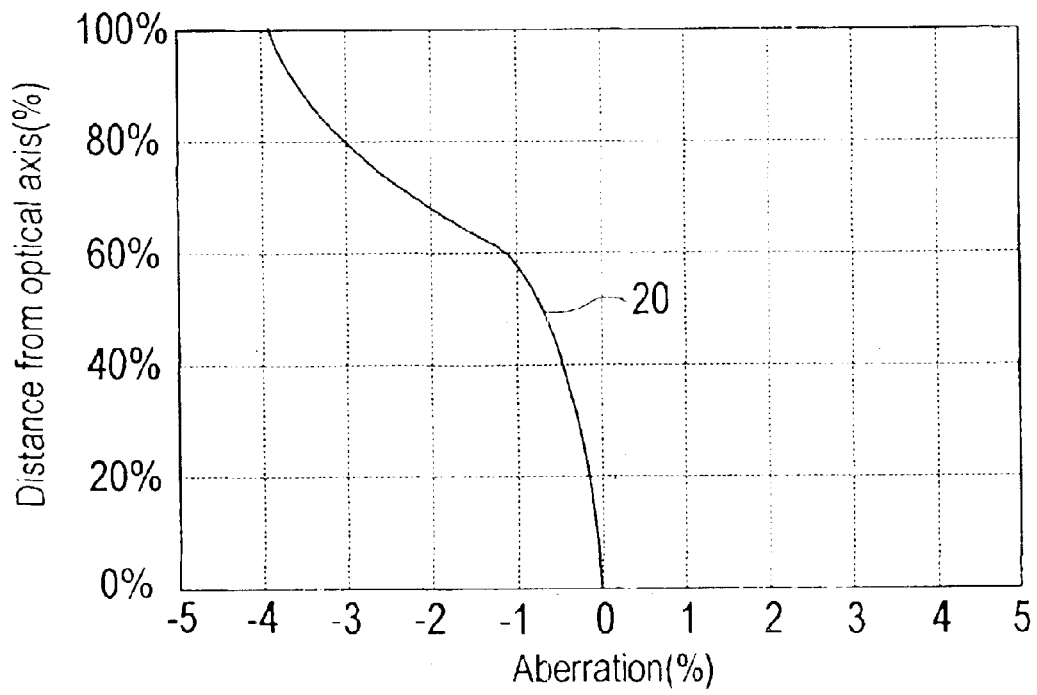
FIG. 3 is a graph of distortion aberration of the image pickup lens of FIG. 2.
Figure 4:
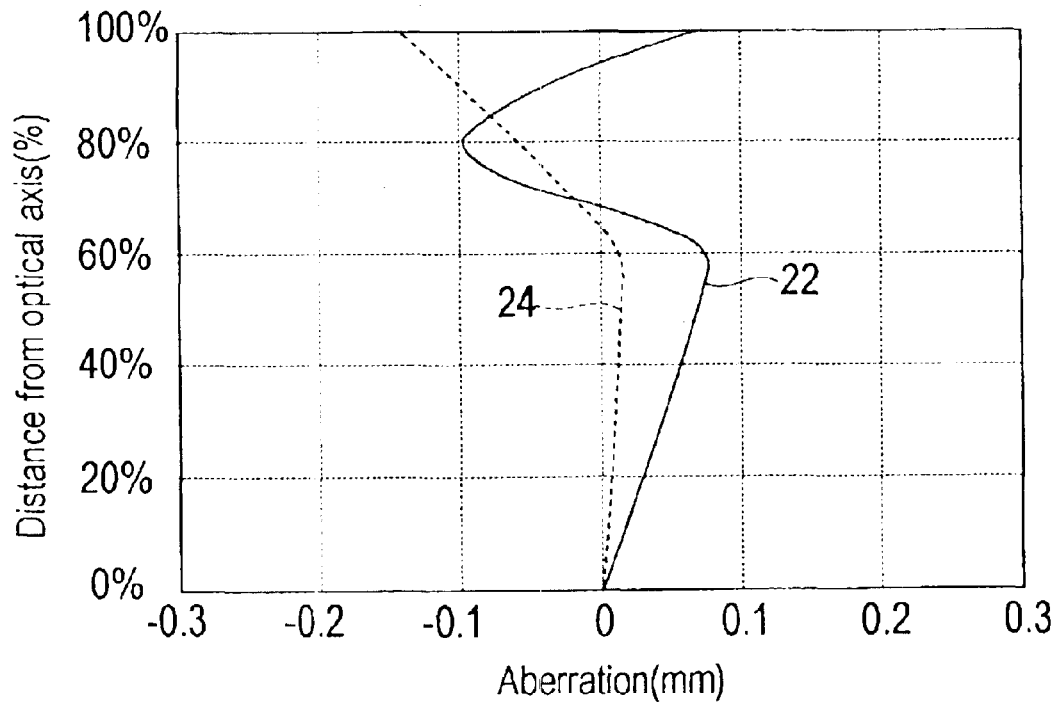
FIG. 4 is a graph of astigmatic aberration of the image pickup lens of FIG. 2.
Figure 5:
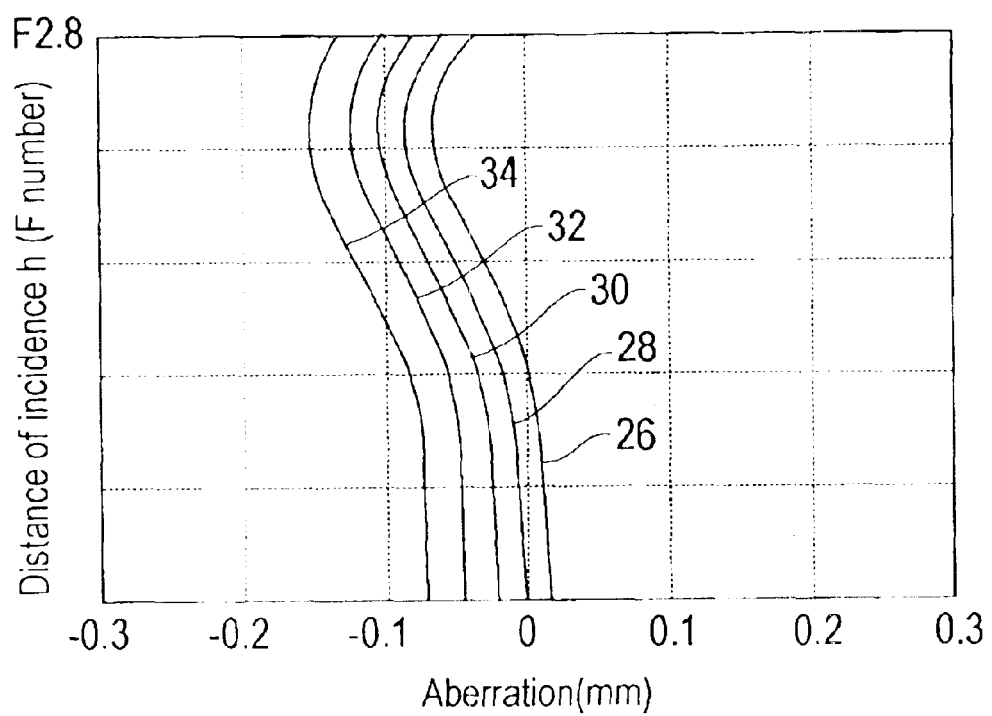
FIG. 5 is a graph of chromatic/spherical aberration of the image pickup lens of FIG. 2.

Graphs are shown of the distortion aberration curve 20 in FIG. 3, astigmatic aberration curves (aberration curve 22 for the meridional plane and aberration curve 24 for the sagittal plane) in FIG. 4, and chromatic/spherical aberration curves (aberration curve 26 for the C line, aberration curve 28 for the d line, aberration curve 30 for the e line, aberration curve 32 for the F line, and aberration curve 34 for the g line) in FIG. 5. The vertical axes of the aberration curves of FIG. 3 and FIG. 4 show the image height, with 100%, 85%, 80%, 70%, 50%, and 30% corresponding respectively to 2.3 mm, 1.9 mm, 1.8 mm, 1.6 mm, 1.1 mm, and 0.68 mm. In the first embodiment, an image height of 2.3 mm when converted into an angle made by the chief ray with the optical axis before incidence on the lens system corresponds to 36°. The vertical axis of the aberration curve of FIG. 5 shows the distance of incidence h (F number); the maximum is F2.8. The horizontal axis indicates the magnitude of aberration.

At an image height of 100% (image height 2.3 mm), the absolute value of the distortion aberration is a maximum of 3.9%, and in the range below an image height of 2.3 mm, the absolute value is less than 3.9%.

At an image height of 100% (image height 2.3 mm), the absolute value of the astigmatic aberration is a maximum of 0.14 mm in the sagittal plane, and in the range below an image height of 2.3 mm, the absolute value is not more than than 0.14 mm.

The absolute value of the chromatic/spherical aberration for the g line at the optical axis is a maximum of 0.18 mm, and the absolute value of the aberration is within 0.18 mm.

Second Embodiment (A) The focal length for the entire system is f=3.74 mm.
(B) The focal length of the first lens is $f_1$=3.98 mm.
(C) The focal length of the second lens is $f_2$=−38.38 mm.
(D) The radius of curvature of the object-side surface of the first lens is $r_1$=4.9982 mm.
(E) The radius of curvature of the image-side surface of the first lens is $r_2$=−1.6179 mm.
(F) The distance from the aperture diaphragm position to the second surface of the second lens is D=2.40 mm.

Hence:

$$|f_1/f_2|=|3.98/-38.38|=0.104 \approx 0.10 \quad (1)$$

$$|r_1/f|=|-4.9982/3.74|=1.336 \approx 1.34 \quad (2)$$

$$|r_1/r_2|=|-4.9982/-1.6179|=3.089 \approx 3.09 \quad (3)$$

$$D/f=2.40/3.74=0.6417 \approx 0.64 \quad (4)$$

Therefore the lens system of the second embodiment satisfies all of the following condition equations (1) through (4).

$$0.09<|f_1/f_2|<0.37 \quad (1)$$

$$1.33<|r_1/f|<47.77 \quad (2)$$

$$3.08<|r_1/r_2|<113.12 \quad (3)$$

$$0.63<D/f<0.87 \quad (4)$$

As indicated in Table 2, the aperture diaphragm $S_1$ is provided at a position 0.10 mm ($d_1$=0.10 mm) in front of the first surface (object-side surface) of the first lens. The numerical aperture (F number) is 2.8, and the combined focal length f is 3.740 mm.

Figure 6:
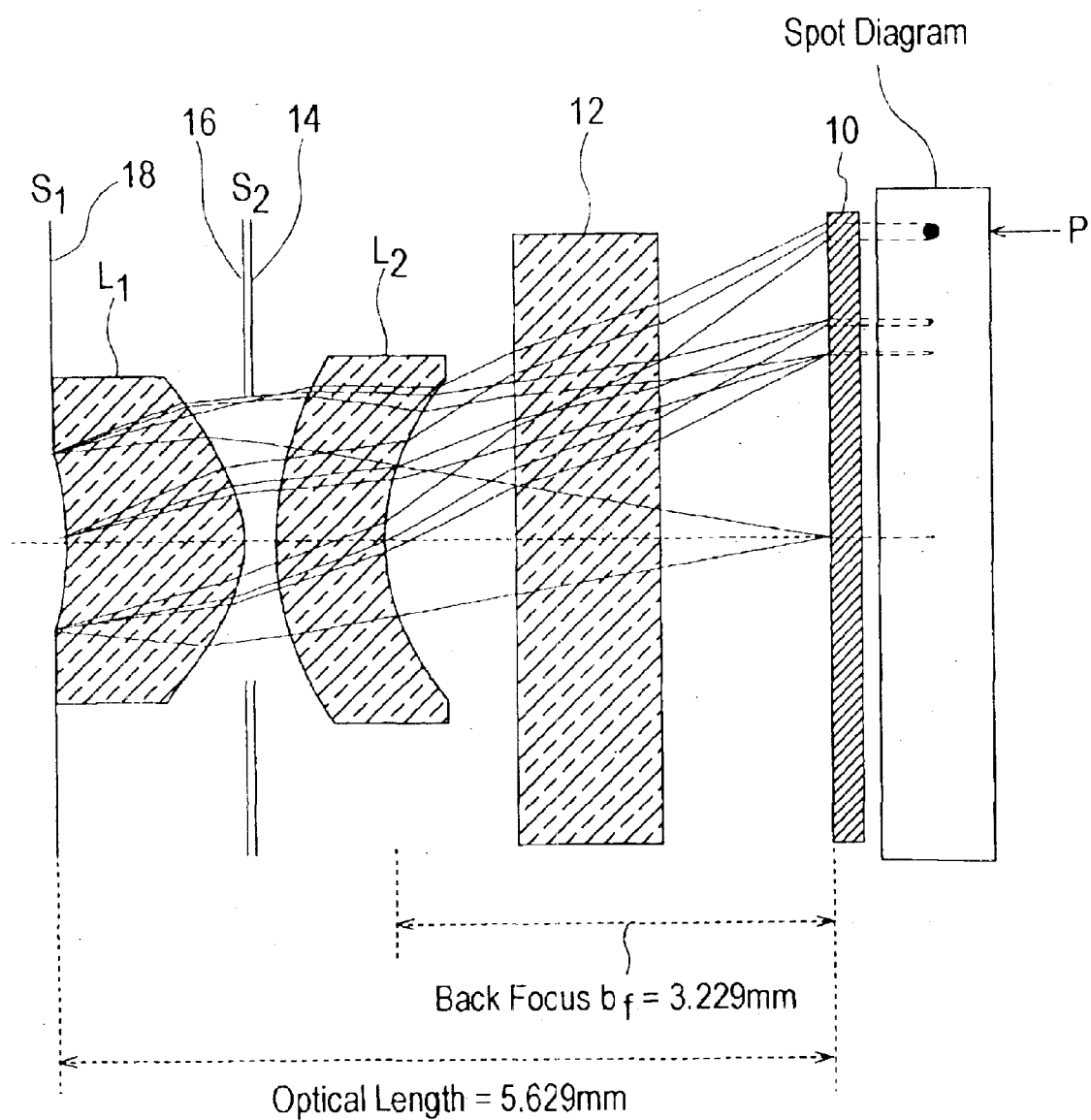
FIG. 6 is a summary cross-sectional view to explain a second embodiment of an image pickup lens of this invention.

FIG. 6 shows the results of ray tracing, and a spot diagram showing the spreading of a point image on the pickup surface. It is seen that there is some spreading of the point image P only very close to the peripheral portion and that a satisfactory point image is obtained over nearly the entirety of the pickup surface.

The optical length is 5.629 mm, which is within 6 mm, and a sufficient back focus of 3.229 mm is also secured.

Figure 7:
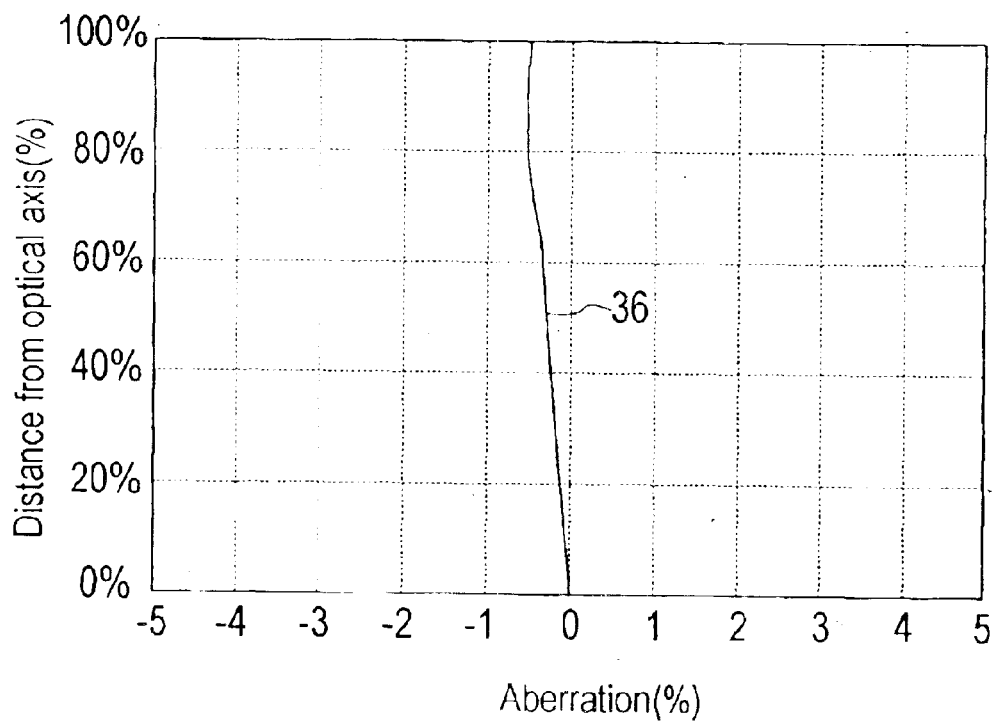
FIG. 7 is a graph of distortion aberration of the image pickup liens of FIG. 6.
Figure 8:
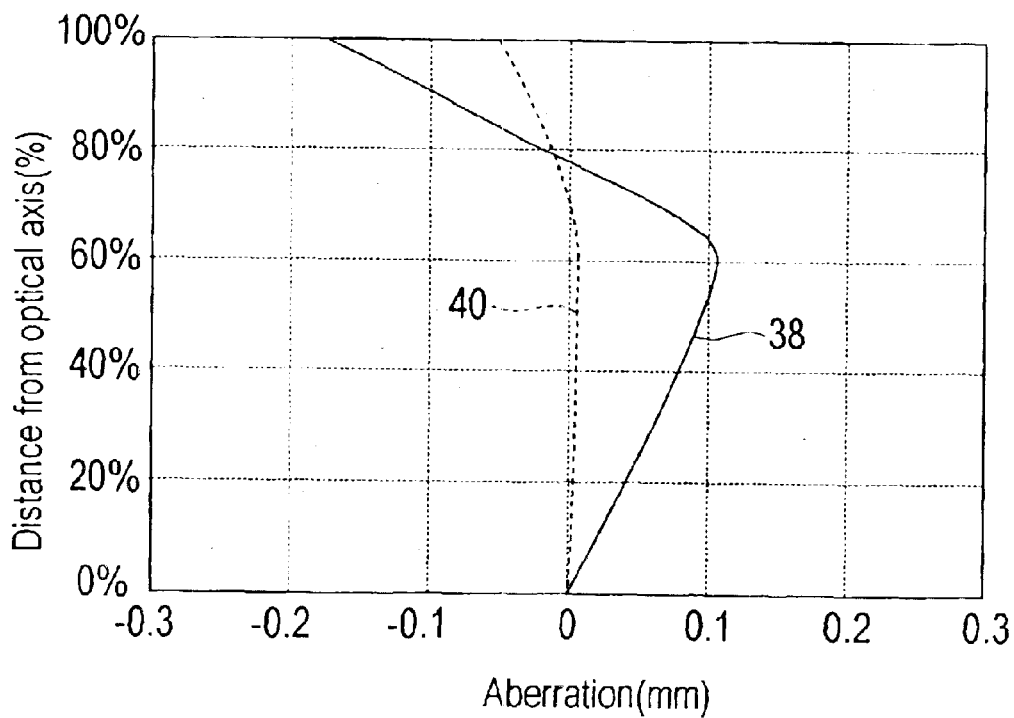
FIG. 8 is a graph of astigmatic aberration of the image pickup lens of FIG. 6.
Figure 9:
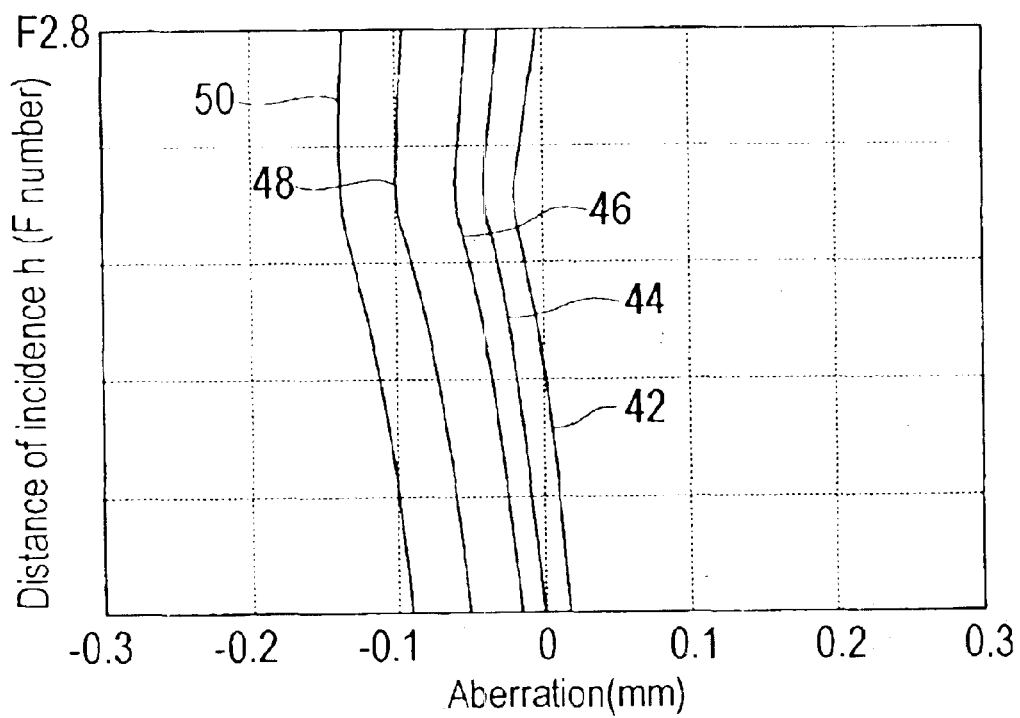
FIG. 9 is a graph of chromatic/spherical aberration of the image pickup lens of FIG. 6.

Graphs are shown of the distortion aberration curve 36 in FIG. 7, astigmatic aberration curves (aberration curve 38 for the meridional plane and aberration curve 40 for the sagittal plane) in FIG. 8, and chromatic/spherical aberration curves (aberration curve 42 for the C line, aberration curve 44 for the d line, aberration curve 46 for the e line, aberration curve 48 for the F line, and aberration curve 50 for the g line) in FIG. 9. The vertical axes of the aberration curves of FIG. 7 and FIG. 8 show the image height, with 100%, 85%, 80%, 70%, 50%, and 30% corresponding respectively to 2.3 mm, 1.9 mm, 1.8 mm, 1.6 mm, 1.1 mm, and 0.68 mm. In the second embodiment, an image height of 2.3 mm when converted into an angle made by the chief ray with the optical axis before incidence on the lens system corresponds to 32°. The horizontal axis indicates the magnitude of aberration. The vertical axis of the aberration curve of FIG. 9 shows the distance of incidence h (F number); the maximum is F2.8.

At an image height of 80% (image height 1.8 mm), the absolute value of the distortion aberration is a maximum of 0.6%, and in the range below an image height of 2.3 mm, the absolute value is within 0.6%.

At an image height of 100% (image height 2.3 mm), the absolute value of the astigmatic aberration is a maximum of 0.17 mm in the meridional plane, and in the range below an image height of 2.3 mm, the absolute value is not more than 0.17 mm.

The absolute value of the chromatic/spherical aberration for the g line at the optical axis is a maximum of 0.15 mm, and the absolute value of the aberration is within 0.15 mm.

Third Embodiment (A) The focal length for the entire system is f=3.912 mm.
(B) The focal length of the first lens is $f_1$=3.73 mm.
(C) The focal length of the second lens is $f_2$=−16.80 mm.
(D) The radius of curvature of the object-side surface of the first lens is $r_1$=−10.1892 mm.
(E) The radius of curvature of the image-side surface of the first lens is $r_2$=−1.7455 mm.
(F) The distance from the aperture diaphragm position to the second surface of the second lens is D=2.765 mm.

Hence:

$$|f_1/f_2|=3.73/-16.80|=0.222 \approx 0.22 \quad (1)$$

$$|r_1/f|=|-10.1892/3.912|=2.605 \approx 2.61 \quad (2)$$

$$|r_1/r_2|=|10.1892/-1.7455|=5.8374 \approx 5.84 \quad (3)$$

$$D/f=2.765/3.912=0.7068 \approx 0.71 \quad (4)$$

Therefore the lens system of the third embodiment satisfies all of the following condition equations (1) through (4).

$$0.09<|f_1/f_2|<0.37 \quad (1)$$

$$1.33<|r_1/f|<47.77 \quad (2)$$

$$3.08<|r_1/r_2|<113.12 \quad (3)$$

$$0.63<D/f<0.87 \quad (4)$$

As indicated in Table 3, the aperture diaphragm $S_1$ is provided at a position 0.085 mm ($d_1$=0.085 mm) in front of the first surface (object-side surface) of the first lens. The numerical aperture (F number) is 2.8, and the combined focal length f is 3.912 mm.

Figure 10:
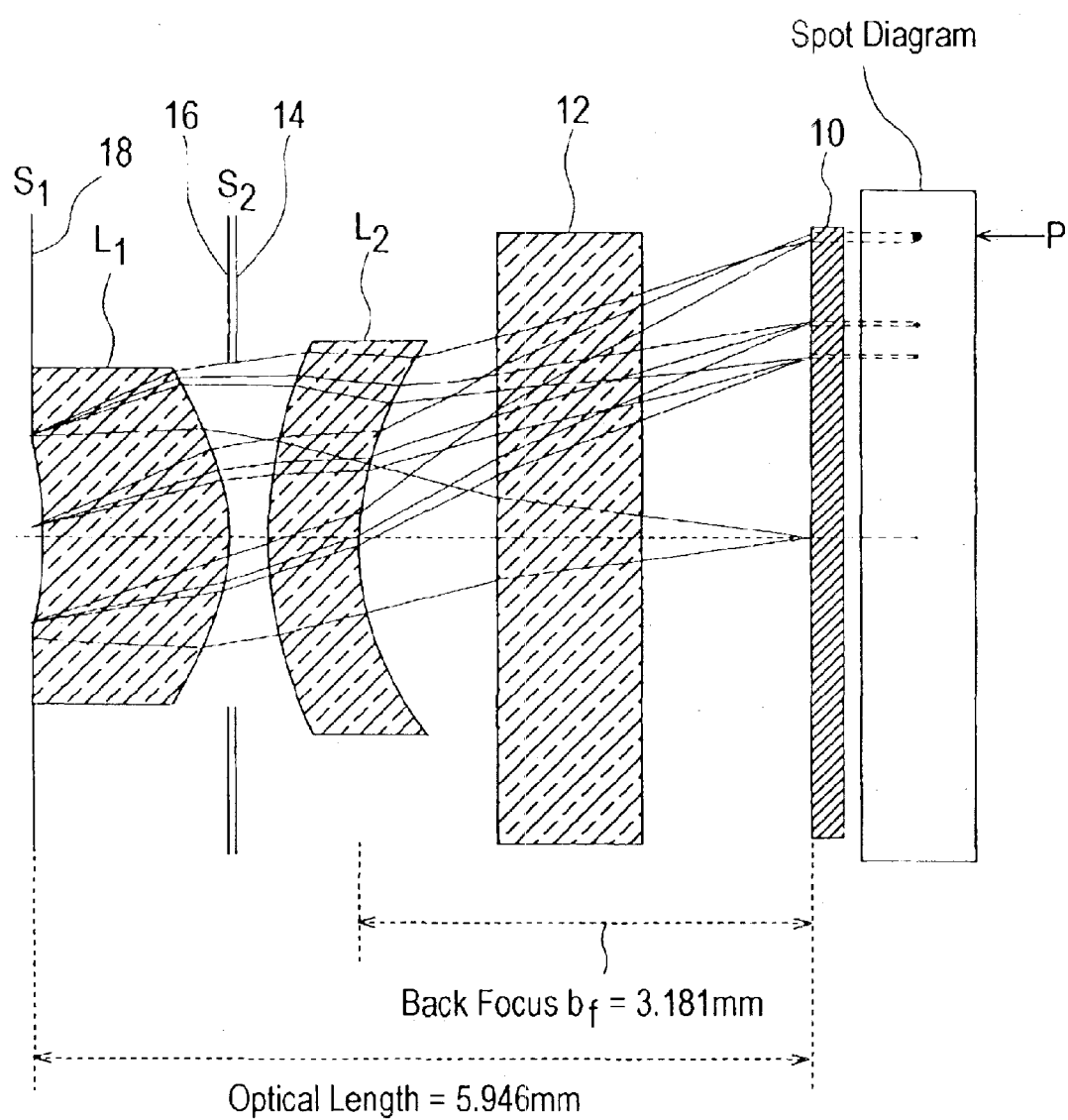
FIG. 10 is a summary cross-sectional view to explain a third embodiment of an image pickup lens of this invention.

FIG. 10 shows the results of ray tracing, and a spot diagram showing the spreading of a point image on the pickup surface. It is seen that there is, some spreading of the point image P only very close to the peripheral portion, and that a satisfactory point image is obtained over nearly the entirety of the pickup surface. The optical length is 5.946 mm, which is within 6 mm, and a sufficient back focus of 3.181 mm is also secured.

Figure 11:
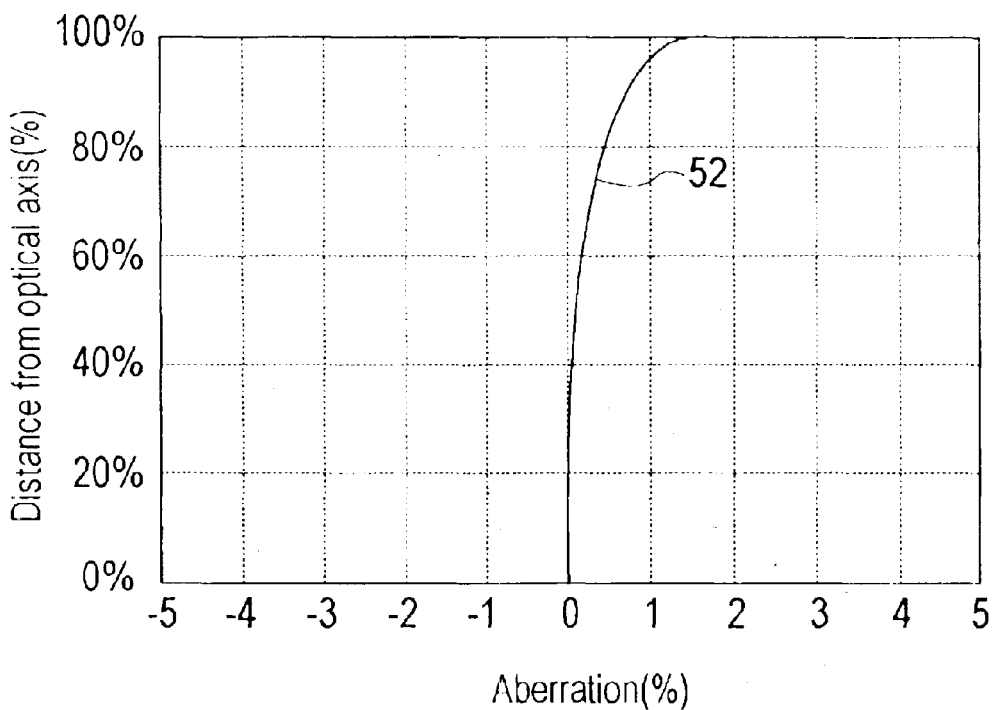
FIG. 11 is a graph of distortion aberration of the image pickup lens of FIG. 10.
Figure 12:
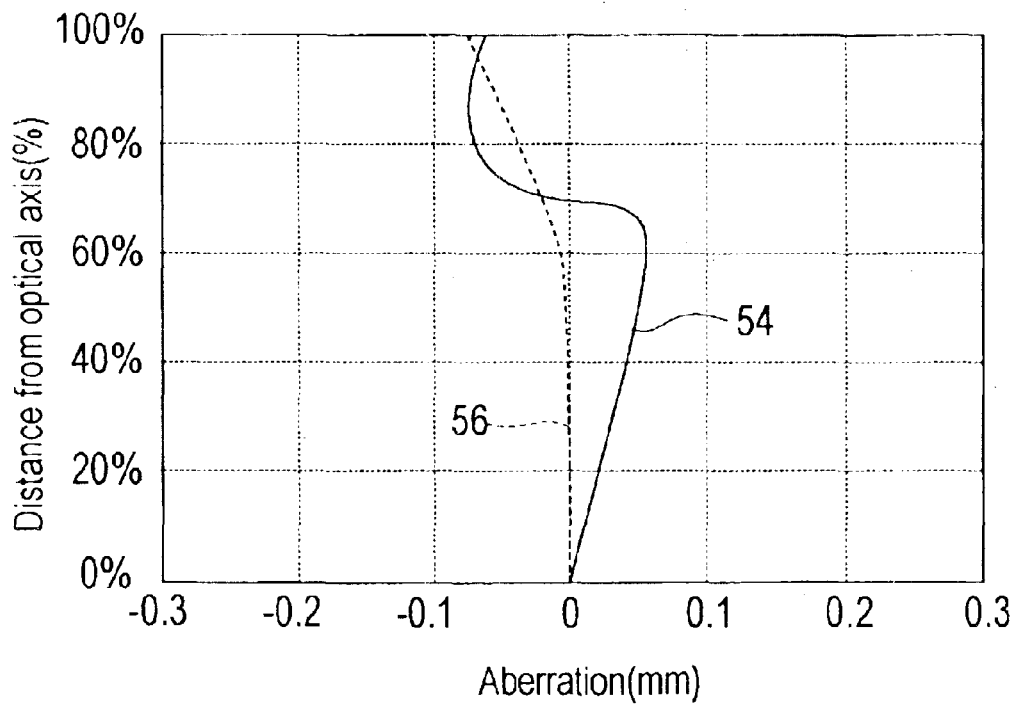
FIG. 12 is a graph of astigmatic aberration of the image pickup lens of FIG. 10.
Figure 13:
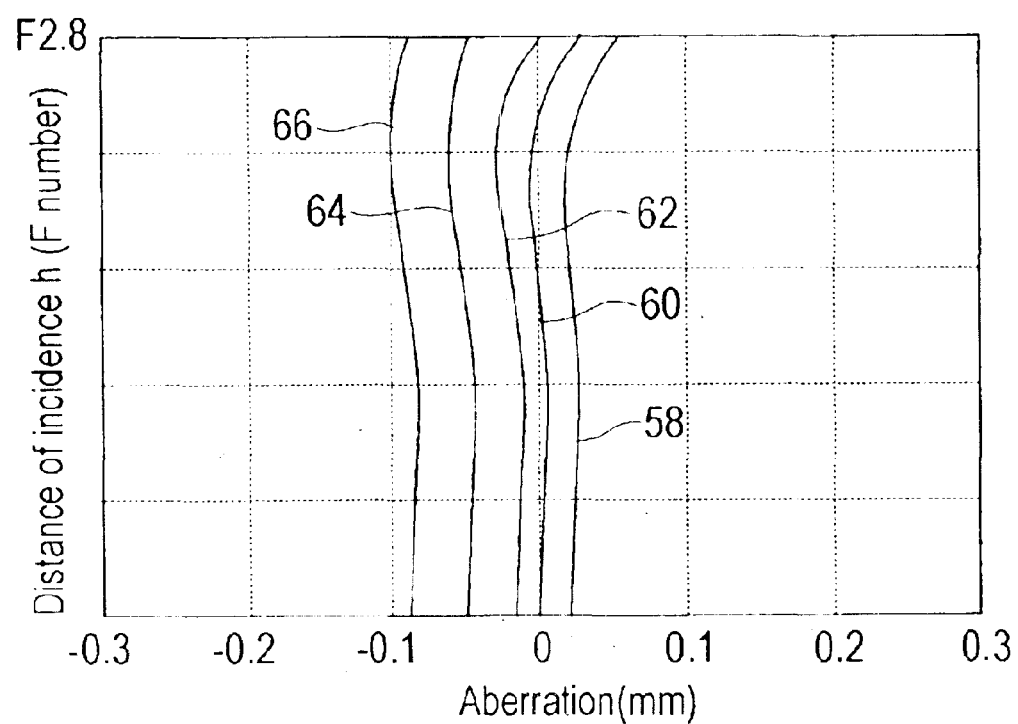
FIG. 13 is a graph of chromatic/spherical aberration of the image pickup lens of FIG. 10.

Graphs are shown of the distortion aberration curve 52 in FIG. 11, astigmatic aberration curves (aberration curve 54 for the meridional plane and aberration curve 56 for the sagittal plane) in FIG. 12, and chromatic/spherical aberration curves (aberration curve 58 for the C line, aberration curve 60 for the d line; aberration curve 62 for the e line, aberration curve 64 for the F line, and aberration curve 66 for the g line) in FIG. 13. The vertical axes of the aberration curves of FIG. 11 and FIG. 12 show the image height, with 100%, 85%, 80%, 70%, 50%, and 30% corresponding respectively to 2.3 mm, 1.9 mm, 1.8 mm, 1.6 mm, 1.1 mm, and 0.68 mm. In the third embodiment, an image height of 2.3 mm when converted into an angle made by the chief ray with the optical axis before incidence on the lens system corresponds to 30°. The vertical axis of the aberration curve of FIG. 13 shows the distance of incidence h (F number); the maximum is F2.8. The horizontal axis indicates the magnitude of aberration.

At an image height of 100% (image height 2.3 mm), the absolute value of the distortion aberration is a maximum of 1.5%, and in the range below an image height of 2.3 mm, the absolute value is within 1.5%.

At an image height of 100% (image height 2.3 mm), the absolute value of the astigmatic aberration is a maximum of 0.08 mm in the sagittal plane, and in the range below an image height of 2.3 mm, the absolute value is not more than than 0.08 mm.

The absolute value of the chromatic/spherical aberration for the g line at the optical axis is a maximum of 0.10 mm, and the absolute value of the aberration i's within 0.10 mm.

Fourth Embodiment (A) The focal length for the entire system is f=3.498 mm.
(B) The focal length of the first lens is $f_1$=2.80 mm.
(C) The focal length of the second lens is $f_2$=−7.73 mm.
(D) The radius of curvature of the object-side surface of the first lens is $r_1$=−167.055 mm.
(E) The radius of curvature of the image-side surface of the first lens is $r_2$=−1.4769 mm.
(F) The distance from the aperture diaphragm position to the second surface of the second lens is D=2.305 mm.

Hence:

$$|f_1/f_2|=|2.80/-7.73|=0.362\approx0.36 \quad (1)$$

$$|r_1/f|=|-1,67.055/3.498|=47.757\approx47.76 \quad (2)$$

$$|r_1/r_2|=|-167.055/-1.4769|=113.112\approx113.11 \quad (3)$$

$$D/f=2.305/3.498=0.6589\approx0.66 \quad (4)$$

Therefore the lens system of the fourth embodiment satisfies all of the following condition equations (1) through (4).

$$0.09<|f_1/f_2|<0.37 \quad (1)$$

$$1.33<|r_1/f|<47.77 \quad (2)$$

$$3.08<|r_1/r_2|<113.12 \quad (3)$$

$$0.63<D/f<0.87 \quad (4)$$

As indicated in Table 4, the aperture diaphragm $S_1$ is provided at a position 0.075 mm ($d_1$=0.075 mm) in front of the first surface (object-side surface) of the first lens. The numerical aperture (F number) is 2.8, and the combined focal length f is 3.498 mm.

Figure 14:
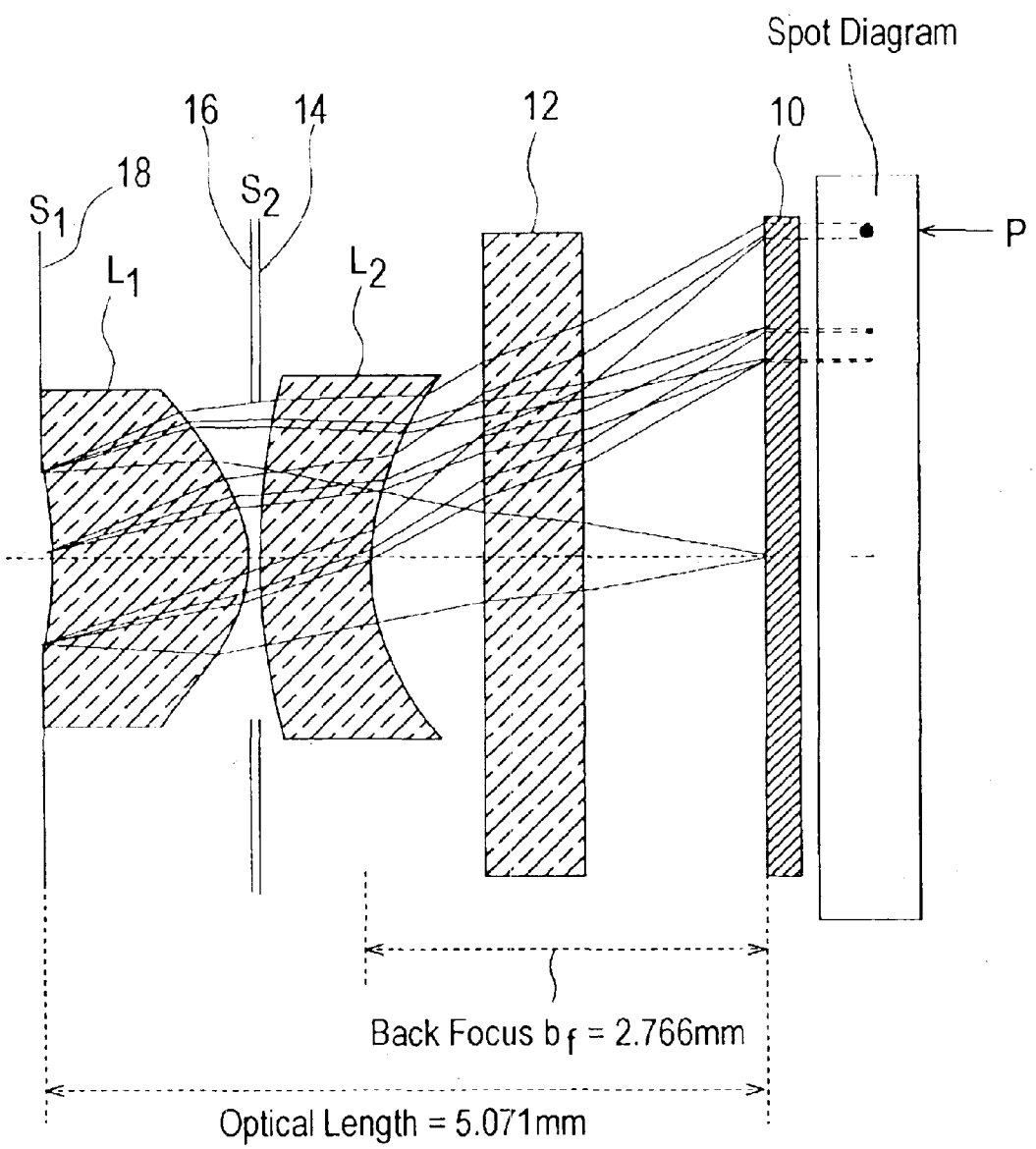
FIG. 14 is a summary cross-sectional view to explain a fourth embodiment of an image pickup lens of this invention.

FIG. 14 shows the results of ray tracing, and a spot diagram showing the spreading of a point image on the pickup surface. It is seen that there is some spreading of the point image P only very close to the peripheral portion, and that a satisfactory point image is obtained over nearly the entirety of the pickup surface. The optical length is 5.071 mm, which is within 6 mm, and a sufficient back focus of 2.766 mm is also secured.

Figure 15:
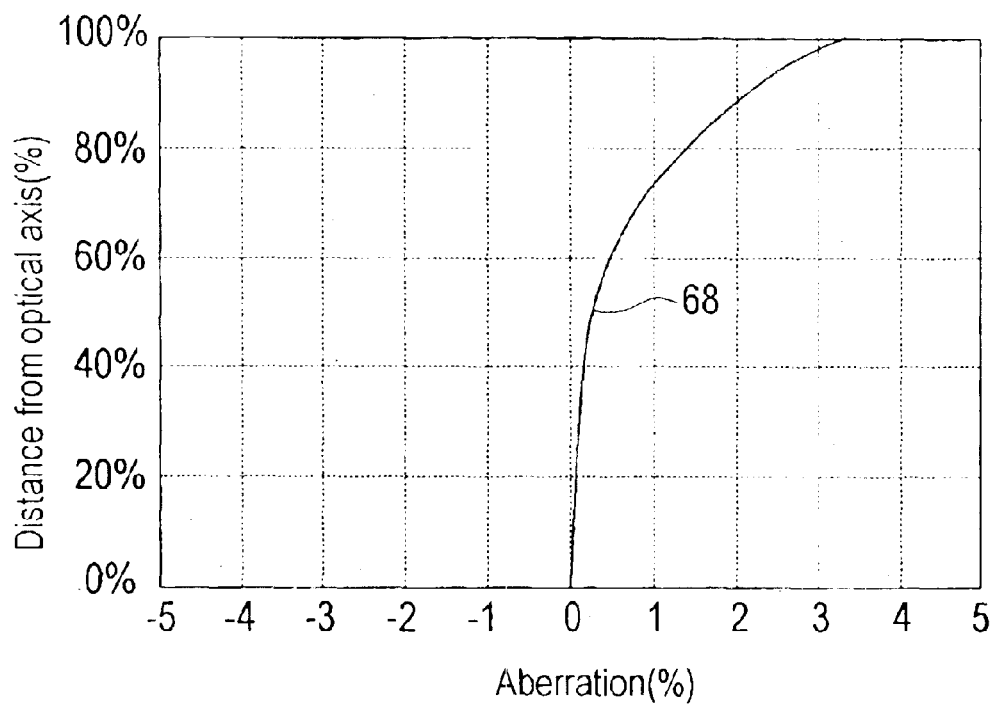
FIG. 15 is a graph of distortion aberration of the image pickup lens of FIG. 14.
Figure 16:
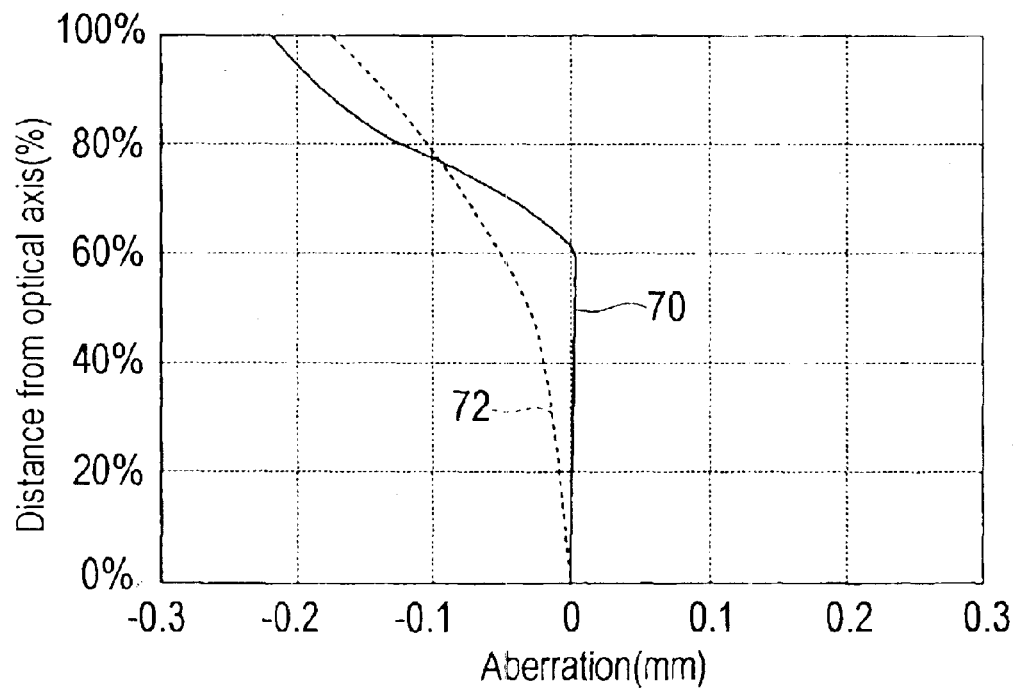
FIG. 16 is a graph of astigmatic aberration of the image pickup lens of FIG. 14; and, FIG. 17 is a graph of chromatic/spherical aberration of the image pickup lens of FIG. 14.
Figure 17:
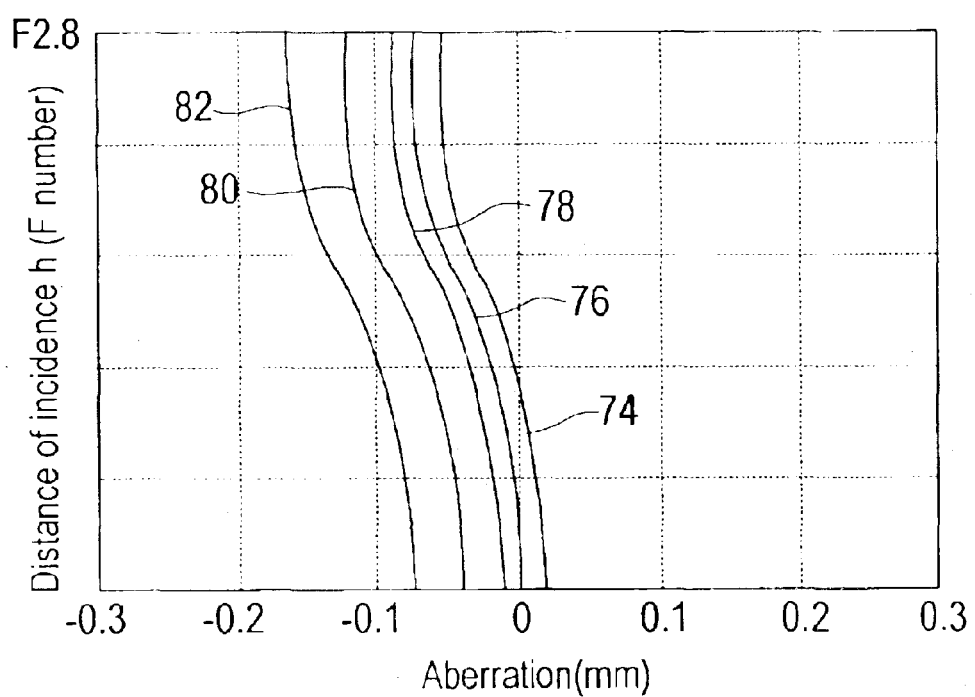

Graphs are shown of the distortion aberration curve 68 in FIG. 15, astigmatic aberration curves (aberration curve 70 for the meridional plane and aberration curve 72 for the sagittal plane) in FIG. 16, and chromatic/spherical aberration curves (aberration curve 74 for the C line, aberration curve 76 for the d line, aberration curve 78 for the e line, aberration curve 80 for the F line, and aberration curve 82 for the g line) in FIG. 17. The vertical axes of the aberration curves of FIG. 15 and FIG. 16 show the image height, with 100%, 85%, 70%, 50%, and 30% corresponding respectively to 2.3 mm, 1.9 mm, 1.6 mm, 1.1 mm, and 0.68 mm. In the fourth embodiment, an image height of 2.3 mm when converted into an angle made by the chief ray with the optical axis before incidence on the lens system corresponds to 32°. The vertical axis of the aberration curve of FIG. 17 shows the distance of incidence h (F number); the maximum is F2.8. The horizontal axis indicates the magnitude of aberration.

At an image height of 100% (image height 2.3 mm), the absolute value of the distortion aberration is a maximum of 3.2%, and in the range below an image height of 2.3 mm, the absolute value is within 3.2%.

At an image height of 100% (image height 2.3 mm), the absolute value of the astigmatic aberration is a maximum of 0.22 mm in the meridional plane, and in the range below an image height of 2.3 mm, the absolute value is not more than 0.22 mm.

The absolute value of the chromatic/spherical aberration for the g line at the optical axis is a maximum of 0.17 mm, and the absolute value of the aberration is within 0.17 mm.

It was found that the lenses for image pickup of all of the above embodiments have the performance required of a lens for mounting in a compact camera which uses a CCD or CMOS device as a pickup element.

Thus as is clear from the above explanations of lenses for image pickup of this invention, by designing the configuration of an image pickup lens such that the condition equations (1) through (4) are satisfied, the problems to be solved by this invention are solved. That is, an image pickup lens is obtained in which various aberrations are satisfactorily corrected, a sufficient back focus is obtained, and a short optical length is maintained.

In the above-described embodiments, ZEONEX E48R plastic was used in the first and second lenses; but in addition to a plastic material other than that of the embodiments, a material other than plastic such as glass can of course also be used, so long as the various conditions explained in the embodiments are satisfied.

As explained above, this invention enables the realization of a pickup lens suitable for use in a compact CCD camera, which can make aggressive use of plastic lenses, in which various aberrations are satisfactorily corrected, and which has an optical length of 6 mm or less.

Moreover, by means of an image pickup lens of this invention, an adequate back focus can be secured, despite the short optical length.

As explained above, in addition to use as a lens for a video camera incorporated into a portable telephone, a pickup lens of this invention is suitable for use as the lens of a video camera incorporated into a PDA (personal digital assistant), as the lens of a video camera incorporated into a toy comprising image recognition functions, and as the lens of monitoring video cameras and security video cameras.

What is claimed is:

1. An image pickup lens, having an aperture diaphragm $S_1$; a first lens $L_1$, having a meniscus shape with concave surface on the object side, and having positive refractive power; a second diaphragm $S_2$; and a second lens $L_2$, having a meniscus shape with concave surface on the image side, and having negative refractive power; and configured by arranging in order, from the object side, the aperture diaphragm $S_1$, the first lens $L_1$, the second diaphragm $S_2$, and the second lens $L_2$; and wherein at least one surface of said first lens $L_1$ is aspherical, and at least one surface of said second lens $L_2$ is aspherical, overall at least two lens surfaces are aspherical, and the following conditions are satisfied:

$$0.09 < |f_1/f_2| < 0.37 \quad (1)$$

$$1.33 < |r_1/f| < 47.77 \quad (2)$$

$$3.08 < |r_1/r_2| < 113.12 \quad (3)$$

$$0.63 < D/f < 0.87 \quad (4)$$

where f is the focal length of the entire system (the combined focal length of the lens system comprising the first and second lenses); $f_1$ is the focal length of the first lens; $f_2$ is the focal length of the second lens; D is the distance from the aperture diaphragm plane to the second surface (image-side surface) of the second lens (lens center length); $r_1$ is the radius of curvature of the object-side surface of the first lens $L_1$ in the vicinity of the optical axis (axial radius of curvature); and $r_2$ is the radius of curvature of the image-side surface of the first lens $L_1$ in the vicinity of the optical axis (axial radius of curvature).

2. The image pickup lens according to claim 1, wherein all the lenses comprised by the image pickup lens are formed from plastic material.

3. The image pickup lens according to claim 2, wherein said first lens $L_1$ and said second lens $L_2$ comprised by the image pickup lens are lenses formed from a cycloolefin plastic material.

4. The image pickup lens according to claim 3, wherein the distance from the object-side surface of said first lens $L_1$ to the image-side surface of said second lens $L_2$ is 2.83 mm or less.

5. The image pickup lens according to claim 1, wherein said first lens $L_1$ and said second lens $L_2$ comprised by the image pickup lens are lenses formed from material with an Abbe number in the range from 45 to 65.

6. The image pickup lens according to claim 5, wherein the distance from the object-side surface of said first lens $L_1$ to the image-side surface of said second lens $L_2$ is 2.83 mm or less.

7. The image pickup lens according to claim 1, wherein the distortion aberration at an image height of 2.3 mm or less is corrected so as to be within 3.9%.

8. The image pickup lens according to claim 1, wherein the astigmatic aberration at an image height of 2.3 mm or less is corrected so as to be not more than 0.22 mm.

9. The image pickup lens according to claim 1, wherein the spherical aberration at the optical axis for light corresponding to the g line is corrected so as to be not more than 0.18 mm.

* * * * *